(12) United States Patent
Shanks

(10) Patent No.: US 8,910,209 B2
(45) Date of Patent: Dec. 9, 2014

(54) LIVE VIDEO MANAGEMENT SYSTEM

(75) Inventor: David Eric Shanks, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1416 days.

(21) Appl. No.: 12/026,995

(22) Filed: Feb. 6, 2008

(65) Prior Publication Data

US 2008/0216127 A1 Sep. 4, 2008

Related U.S. Application Data

(60) Provisional application No. 60/888,629, filed on Feb. 7, 2007, provisional application No. 60/888,989, filed on Feb. 9, 2007.

(51) Int. Cl.
| | |
|---|---|
| *G06F 3/00* | (2006.01) |
| *G06F 13/00* | (2006.01) |
| *H04N 5/445* | (2011.01) |
| *H04N 21/81* | (2011.01) |
| *H04N 21/431* | (2011.01) |
| *H04N 5/45* | (2011.01) |
| *H04N 21/61* | (2011.01) |
| *H04N 21/218* | (2011.01) |
| *H04N 21/443* | (2011.01) |
| *H04N 5/44* | (2011.01) |

(52) U.S. Cl.
CPC ....... *H04N 5/44591* (2013.01); *H04N 21/8126* (2013.01); *H04N 21/4312* (2013.01); *H04N 5/45* (2013.01); *H04N 2005/4412* (2013.01); *H04N 21/6143* (2013.01); *H04N 21/21805* (2013.01); *H04N 21/4438* (2013.01); *H04N 21/4314* (2013.01)
USPC .......................................................... 725/44

(58) Field of Classification Search
CPC ............ H04N 21/8126; H04N 21/462; H04N 21/21805; H04N 21/6587; H04N 21/4438; H04N 21/42204; H04N 21/4312; H04N 21/6143; H04N 21/6193
USPC ........... 725/37, 38, 42, 44, 53, 40, 43, 27, 87, 725/67, 68
See application file for complete search history.

(56) References Cited

U.S. PATENT DOCUMENTS 6,799,327 B1 * 9/2004 Reynolds et al. ................ 725/42
2002/0067376 A1 * 6/2002 Martin et al. .................. 345/810
(Continued)

FOREIGN PATENT DOCUMENTS

WO 99/40506 8/1999

OTHER PUBLICATIONS

European Search Report and Search Opinion dated Mar. 27, 2009 in European patent Application No. 08250428.3 filed Feb. 7, 2008 by David Eric Shanks.

*Primary Examiner* — Nasser Goodarzi
*Assistant Examiner* — An Nguyen

(57) ABSTRACT

The present invention discloses a mosaic video channel and a system for generating the mosaic video channel. A mosaic video channel in accordance with the present invention is displayed on a monitor with a plurality of individual video feeds being presented at a given time, and comprises a plurality of video cells presenting at least video information, each video cell associated with one of the plurality of individual video feeds, a cursor, which can be moved between the plurality of video cells, for selecting at least one characteristic associated with a selected video cell, and a receiver, coupled to the monitor and receiving the mosaic video channel, wherein the mosaic channel is changed via a controller which initiates a logo wipe across the mosaic video channel.

25 Claims, 7 Drawing Sheets

FIG. 2A

(56) References Cited

U.S. PATENT DOCUMENTS

| | | |
|---|---|---|
| 2003/0126597 A1* | 7/2003 | Darby et al. .................... 725/32 |
| 2004/0060061 A1* | 3/2004 | Parker ............................ 725/38 |
| 2004/0070593 A1 | 4/2004 | Neely et al. |
| 2004/0117831 A1* | 6/2004 | Ellis et al. ....................... 725/53 |
| 2004/0252194 A1* | 12/2004 | Lin ................................ 348/169 |
| 2006/0230427 A1* | 10/2006 | Kunkel et al. ................. 725/133 |
| 2008/0086456 A1* | 4/2008 | Rasanen et al. ................... 707/3 |

* cited by examiner

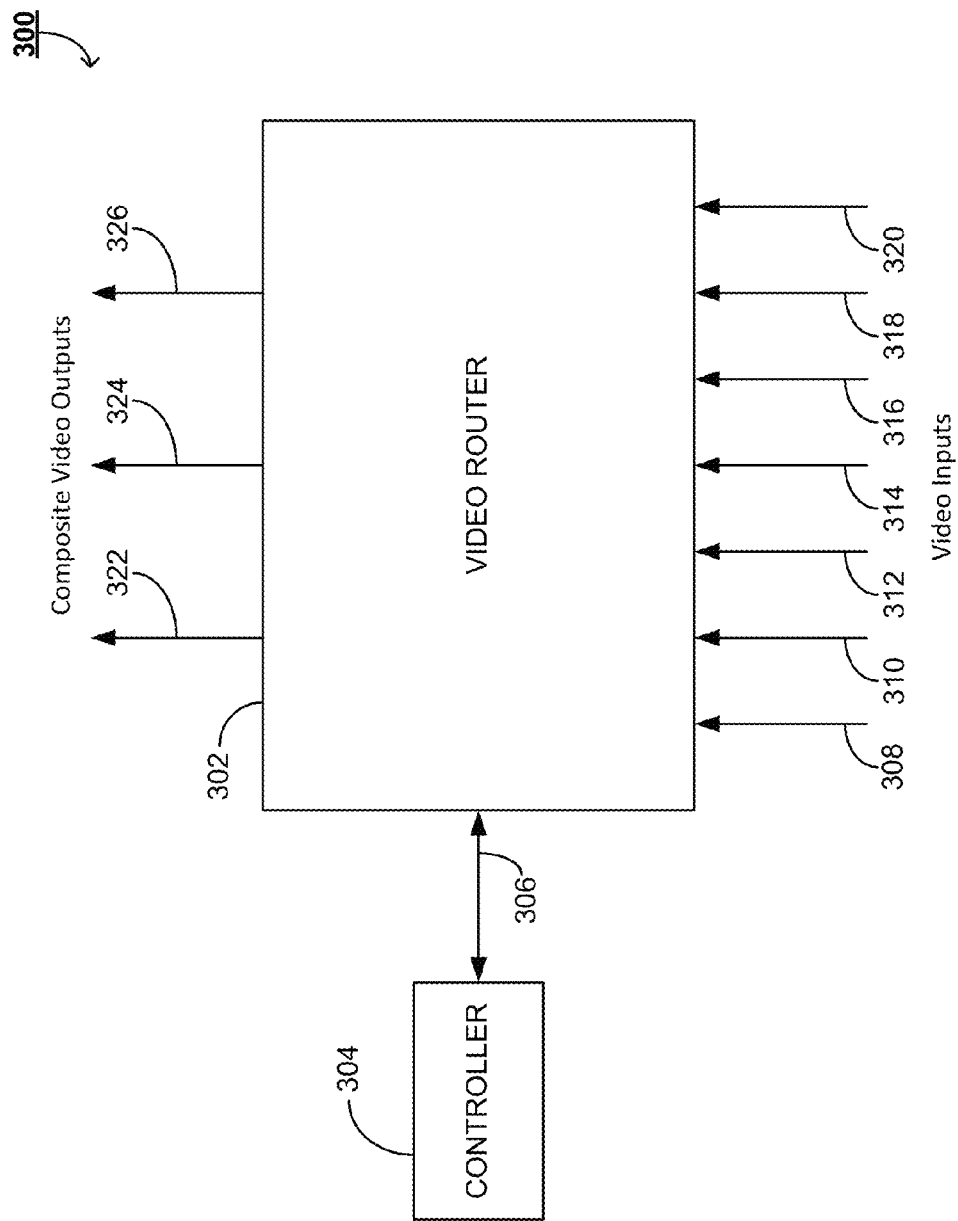

LIVE VIDEO MANAGEMENT SYSTEM

CROSS-REFERENCE TO RELATED APPLICATIONS

This application claims the benefit under 35 U.S.C. Section 119(e) of U.S. Provisional Application Ser. No. 60/888,629, filed on Feb. 7, 2007, by David E. Shanks, entitled "LIVE VIDEO MANAGEMENT SYSTEM," and also claims the benefit under 35 U.S.C. Section 119(e) of U.S. Provisional Application Ser. No. 60/888,989, filed Feb. 9, 2007 by David E. Shanks, entitled "LIVE VIDEO MANAGEMENT SYSTEM," which applications are incorporated by reference herein.

BACKGROUND OF THE INVENTION

1. Field of the Invention

The present invention relates generally to satellite video systems, and in particular, to a method, apparatus, and article of manufacture for a live video management system for presentation of multiple video cells in an on-screen display.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to viewers, viewers will like and expect to see programming on monitor 114 that relate to their specific needs and desires.

SUMMARY OF THE INVENTION

To minimize the limitations in the prior art, and to minimize other limitations that will become apparent upon reading and understanding the present specification, the present invention discloses a mosaic video channel and a system for generating the mosaic video channel.

A mosaic video channel in accordance with the present invention is displayed on a monitor with a plurality of individual video feeds being presented at a given time, and comprises a plurality of video cells presenting at least video information, each video cell associated with one of the plurality of individual video feeds, a cursor, which can be moved between the plurality of video cells, for selecting at least one characteristic associated with a selected video cell, and a receiver, coupled to the monitor and receiving the mosaic video channel, wherein the mosaic channel is changed via a controller which initiates a logo wipe across the mosaic video channel.

Such a mosaic channel further optionally comprises changing the orientation of the video cells when the logo wipe occurs, the controller changes at least one video feed associated with one of the plurality of video cells, access to the video feeds associated with one of the plurality of video cells is accessible only when the mosaic channel is accessible by the receiver, and at least one orientation of video cells is a predetermined orientation of video cells.

A system in accordance with the present invention dynamically changes a mosaic video channel, and comprises a controller and a video router, coupled to the controller, the video router accepting video inputs from a plurality of sources and generating a plurality of mosaic channel configurations as outputs, wherein the controller commands the video router to use specific ones of the plurality of sources in a given mosaic channel configuration.

Such a system further optionally includes the controller further commanding the video router to selectively switch between a first mosaic channel configuration and a second mosaic channel configuration, the controller commands the video router to switch between the first mosaic channel configuration and the second mosaic channel configuration using a logo wipe, access to the video feeds associated with one of the plurality of video cells is accessible only when the mosaic channel is accessible by the receiver, and at least one of the plurality of mosaic channel configurations is a predetermined layout of video cells.

An apparatus in accordance with the present invention displays a mosaic video channel, the mosaic video channel having a plurality of video cells being presented at a given time, and comprises a broadcast delivery system, comprising a transmitter and a receiver, a monitor, coupled to the receiver, for selectively displaying the mosaic video channel, each video cell associated with one of a plurality of individual video feeds, and a cursor, displayed on the monitor, which is movable between the plurality of video cells, for selecting at least one characteristic associated with a selected video cell, such that when a video program associated with the selected video cell is selected, the characteristic of the selected video cell is presented; wherein the mosaic channel is changed via a controller which initiates a logo wipe across the mosaic video channel.

Such an apparatus further optionally comprises the broadcast delivery system being a satellite television delivery system, a plurality of mosaic video channels, access being granted only to a subset of the plurality of mosaic video channels at a given time, access being granted access to only one of the mosaic video channels at a time, access to the video feeds associated with one of the plurality of video cells being accessible only when the mosaic channel is accessible by the receiver, each of the plurality of mosaic video channels comprising a video cell common to all of the mosaic video channels, at least one configuration of the plurality of video cells is a predetermined layout of video cells, and predictive gaming information is compared to data transmitted with at least one of the individual video feeds.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout:

FIG. 3 illustrates an embodiment of a video control system in accordance with the present invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Interactive Mosaic Channel Display Diagram

Figure 1:
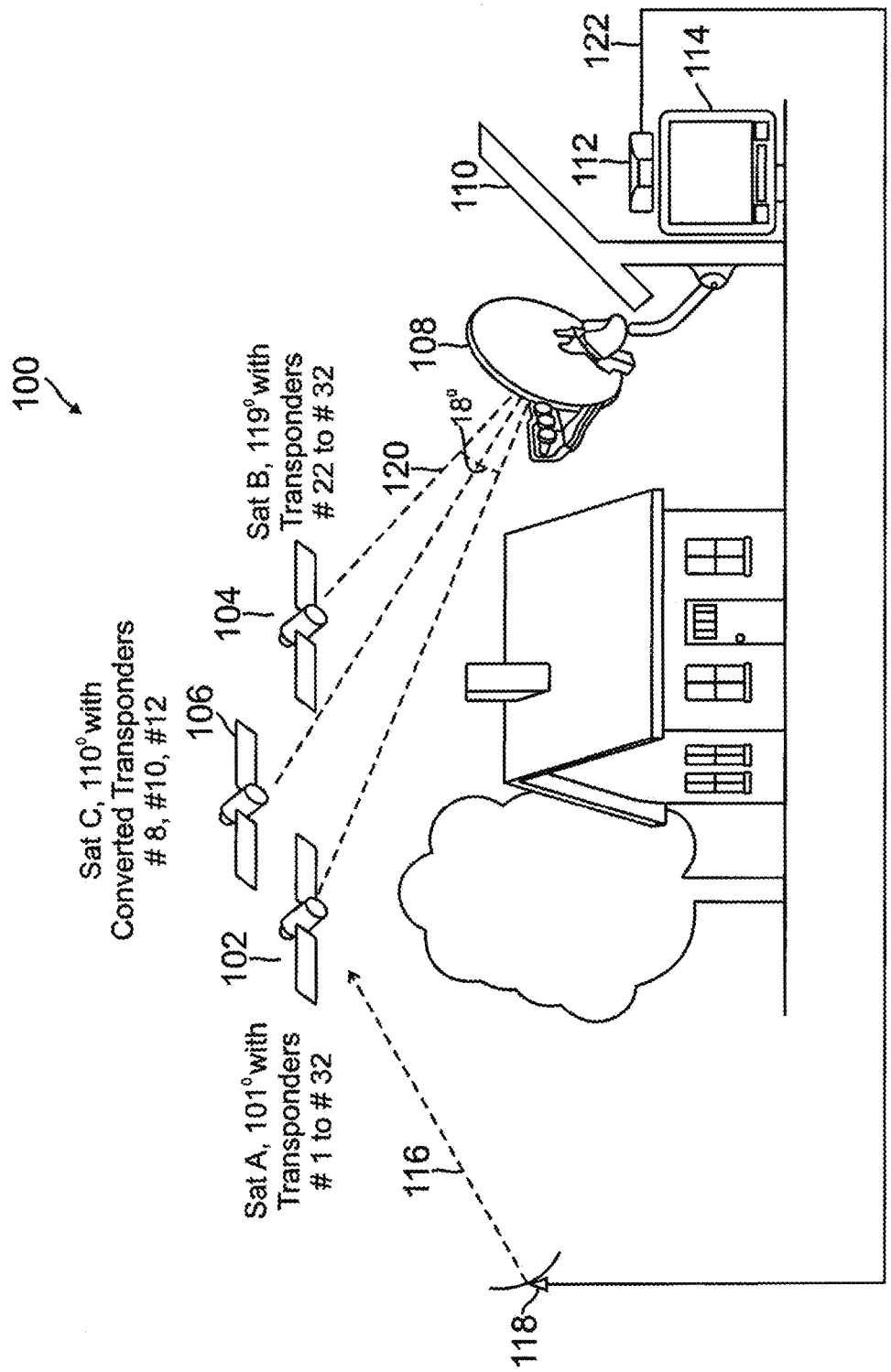
FIG. 1 illustrates a typical satellite television installation of the related art.
Figure 2A:
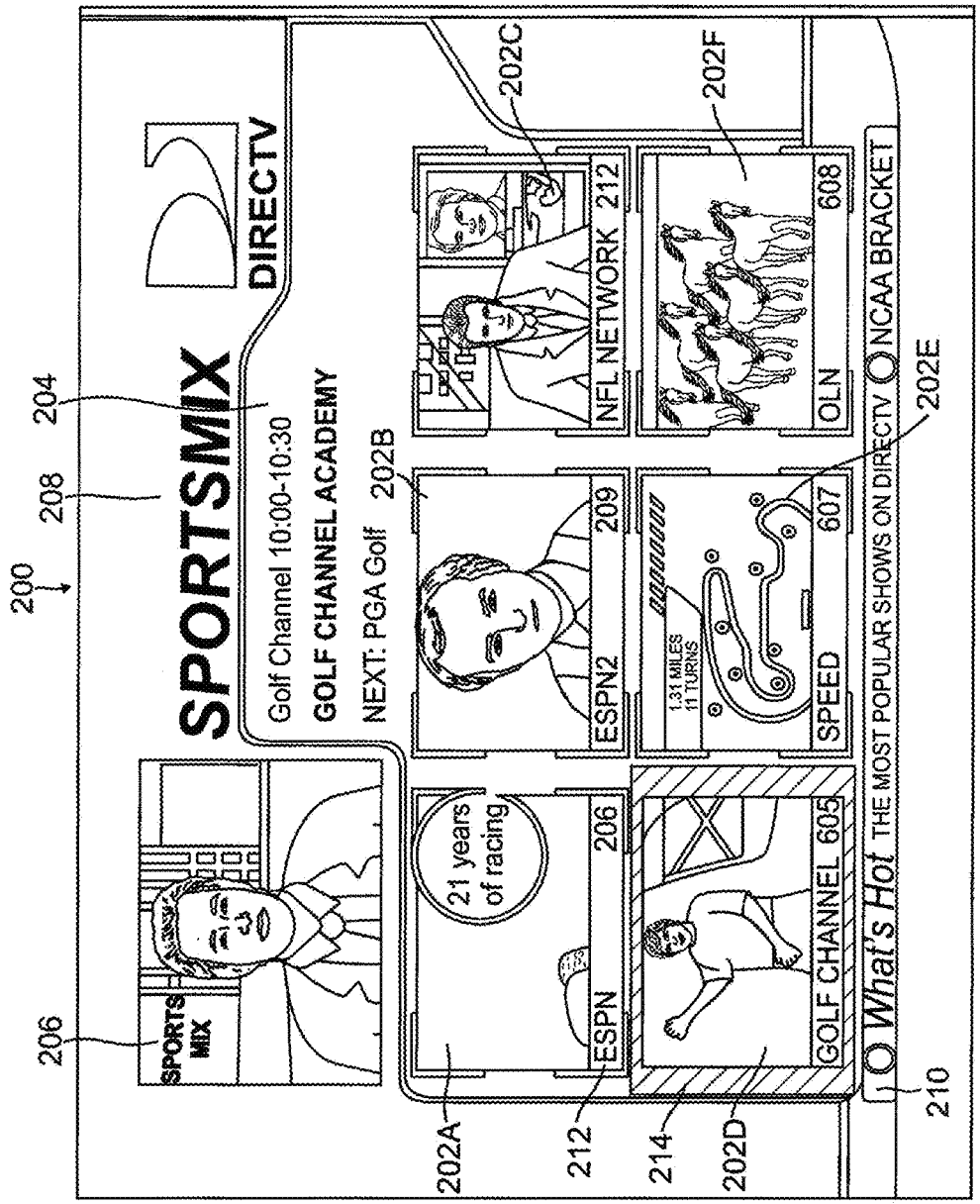
FIG. 2A illustrates a typical six-cell matrix with a generic video feed in accordance with the present invention.

FIG. 2A illustrates a typical matrix with a generic video feed in accordance with the present invention.

Interactive mosaic channel 200 is shown as being displayed on monitor 114. Within interactive mosaic channel 200, there are a number of video cells 202A-202F and a text box 204, also referred to as an On Screen Display (OSD) 204. Optionally, the interactive mosaic channel 200 further comprises a separate video cell 206, also called a "barker cell" 206, a background video 208, and a control bar 210. The video cells 202A-F optionally comprise a channel identification (channel ID) portion 212. Further, cursor 214 is also optionally included to allow for interaction with each of the video cells 202A-202F and barker cell 206.

The number of video cells 202A-F can change based on the number of video cells 202 A-F desired. As the number of video cells 202A-F increases, of course, there must be a reduction in the size of the video cells 202A-F to ensure that the video cells are differentiated on the monitor 114. As the number of video cells 202A-F decreases, the size of the video cells 202A-F can increase, since there is more space available on monitor 114 to display video cells 202A-F.

Further, the placement of video cells 202A-F, barker cell 206, text box 204, and control bar 210 is not limited to the positions on monitor 114 as shown in FIG. 2A. These elements can be displayed anywhere on monitor 114 without departing from the scope of the present invention.

As there are multiple video feeds and video cell 202A-F and barker cell 206 being presented, each video cell 202A-F and barker cell 206, as well as background video 208 and possibly control bar 210, have associated audio portions that can be played. Presenting more than one audio stream may be confusing; as such, it is typical that only one audio stream of information is presented at a given time. However, each of the video feeds may also have closed-captioning information associated with it, and selection of a closed-captioned presentation, rather than an audio presentation, can be performed as described herein.

Video Cells

Video cells 202A-F each comprise a separate viewer channel of programming. So for example, in an interactive mosaic channel that is focused on news programming, cell 1 could contain the video programming associated with the viewer channel of FOX News Channel, cell 2 could contain the video programming associated with the viewer channel of CNN, cell 3 could contain the video programming associated with the viewer channel of Headline News, cell 4 could contain the video programming associated with the viewer channel of MSNBC, cell 5 could contain the video programming associated with the viewer channel of The Weather Channel, and cell 6 could contain the video programming associated with the viewer channel of C-SPAN. The placement and video programming content for each video cell 202A-F can depend on a wide variety of factors, such as Nielsen ratings for a given channel, whether a given channel is available on a specific viewer's programming package, viewer channel number (lowest to highest or highest to lowest) or can be decided or changed based on programming that is present on one or more of the viewer channels available for the interactive mosaic channel. For example, and not by way of limitation, an important vote on the floor of the Senate may be taking place, and a decision can be made to change the placement of C-SPAN from video cell 202F to video cell 202A for a period of time. Changes in presentation for the interactive mosaic channel 200 are discussed below.

Within each of the video cells 202A-F is a channel identification (ID) box 212. Typically, the channel ID box 212 indicates to the viewer the moniker or name that is associated with the video feed being shown in that respective video cell 202A-F, and the viewer channel number associated with the video feed being shown in that respective video cell 202A-F. For example and not by way of limitation, in video cell 202A, which as described above, is showing the video feed for ESPN, channel ID box 212 would indicate "ESPN" as well as, optionally, a channel number, e.g., "206" to indicate to the viewer that the video feed being shown in video cell 202A is that of ESPN, and that the viewer is accustomed to seeing this full-monitor 114 video programming on viewer channel 206.

Other information may also appear in channel ID box 212, such as an indication that the video feed that is being presented in the associated video cell 202A-F is a "user favorite" channel, the channel ID box 212 may be presented in a different color or video texture to indicate that the video feed that is being presented in the associated video cell 202A-F is a channel that presents programming that adults may wish to block from their children's view or has closed-captioning available, etc. Many possibilities are available within the scope of the present invention to present various types of video information within channel ID box 212 for viewer selection and benefit. The channel ID box 212 may also appear without a video cell 202A-F for those video feeds that are channel blocked via parental control, or otherwise unavailable to a specific viewer because of the viewer's programming package or other reasons.

Text Box

Text box 204 contains textual information that is useful to the viewer, and this information can change depending on the viewer's selection of interactive services as described herein. For example, the text box 204 can contain a generic statement about the genre of the interactive mosaic channel 200, or statements directed to a selected video cell 202A-F or information related to the channel ID box 212 to describe to a user the meaning of the information presented in the channel ID box 212 or other information related to the video cell 202A-F and channel ID box 212. The text box can also scroll to present additional information to the viewer that does not all fit within text box 204 at a given time.

There can also be default text associated with each interactive mosaic channel 200, and, depending on the capabilities of IRD 112, each time an interactive mosaic channel 200 is tuned to, a default descriptive text shall be displayed in the text box 204.

Barker Cell

Barker cell 206 is a presentation of video data that can relate to the video cells 202A-F that are present in interactive mosaic channel 200. For those interactive mosaic channels 200 that have the optional barker cell 206, the barker cell 206 can use audio or video clues to direct the user to one of the video cells 202A-F for more information on a given topic, or provide an overview of the information presented within the video cells 202A-F. For example, the audio and video associated with barker cell 206 in a news format can be a series of stories that are being covered in more depth on the viewer channels being shown in video cells 202A-F, and the barker cell 206 audio and video can then direct the viewer to tune the IRD 112 or monitor 114 to a specific video cell 202A-F for more information on that topic. The barker cell 206 can also be used to provide an overview of the news stories, either those presented in video cells 202A-F or other news stories of interest, without directing the viewer to one of the video presentations being discussed in the video feeds shown in video cells 202A-F.

Barker cell 206 can present audio and video information that is not available on any other viewer channel that is accessible to IRD 112 or monitor 114, other than within the barker cell 206 of the interactive mosaic channel 200. When the barker cell 206 presents audio and video information that is not present on any other viewer channel accessible to IRD 112 or monitor 114, then the barker cell 206 does not have an associated channel ID box 212.

Background Video

Background video 208 is typically a backdrop for the interactive mosaic channel 200. The background video 208 can be related to the genre of the interactive mosaic channel 200; for example, in a news environment, the background video 208 can be related to a top news story, the stock market exchange building, a prominent government building, etc. The background video 208 can be changed or can be a dynamic video depending on the desires of the editorial staff or viewer preferences. Further, the background video 208 can be a logo or other indicator of the source of the interactive mosaic channel 200, such as DIRECTV.

Interactive Features

Figure 2B:
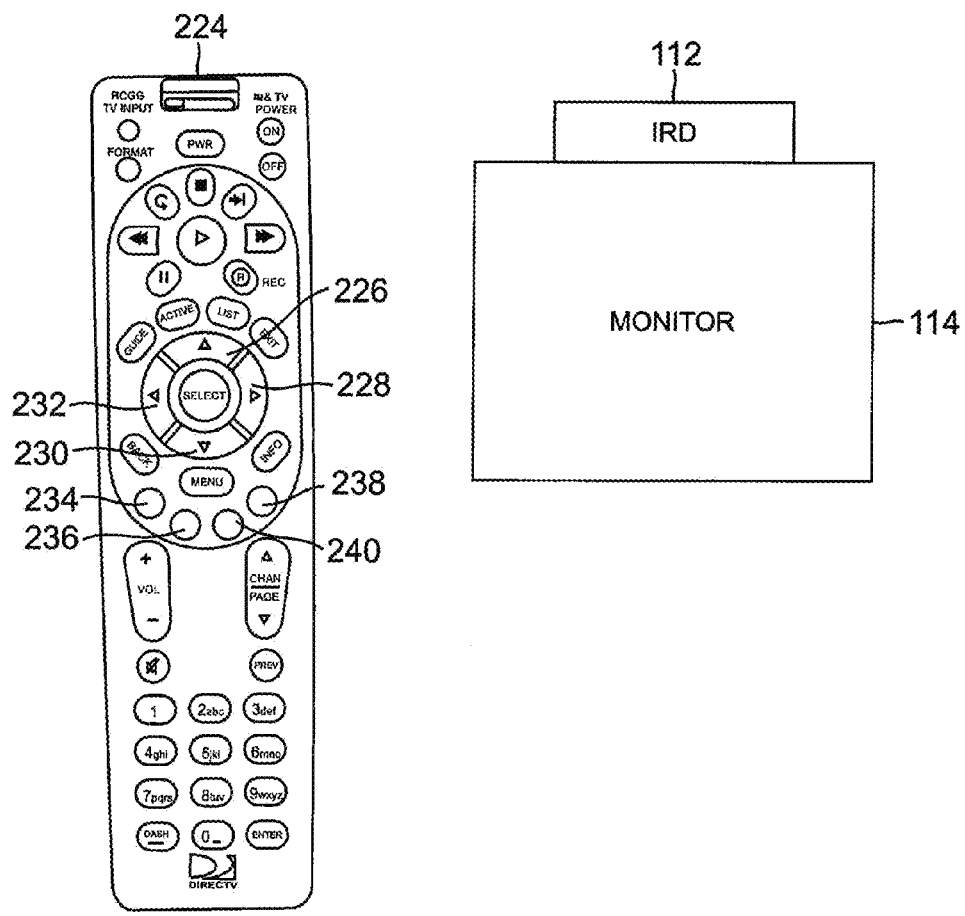
FIG. 2B illustrates a remote control used in the present invention.

FIG. 2B illustrates a remote control used in the present invention.

Typically, IRD 112 and monitor 114 are controlled by a remote control device 224, which allows viewers a convenient way to control audio volume, channel selection, and other features and display characteristics from a distance away from the IRD 112 and/or monitor 114.

Each video cell 202A-F has an associated channel ID box 212, and one of the video cells, cell 202D, has a cursor 214 surrounding that specific video cell 202 and, optionally, channel ID box 212. The cursor 214 indicates that the specific video cell 202 and channel ID 212 has been selected by the viewer. The cursor 214 is typically controlled by buttons 226-232, but can be controlled by other buttons on the remote control 224 if desired.

By selecting a given video cell 202A-F, the viewer is selecting a specific characteristic associated with that given video cell 202A-F, or associated video feed used to generate that video cell 202A-F. In most instances, when the viewer selects a given video cell 202, the audio portion associated with the selected video cell 202 will be presented to the viewer, rather than the audio portion associated with the barker cell 206 or a generic audio track that is associated with interactive mosaic channel 200. Further, selection of a given video cell 202A-F with cursor 214 may also select a closed captioning data stream associated with the selected video cell 202, depending on the availability of such a data stream and/or other settings that a viewer has selected. Cursor 214 can be moved to any of the video cells 202A-F, and, optionally, can be moved to select text box 204 or control bar 210.

When cursor 214 is moved to a given video cell 202A-F via buttons 226-232, text box 204 also may undergo a change in information. Typically, when the video cell 202A-F is selected by the viewer, indicated by the presence of cursor 214, text box 204 will present the information in the Advanced Program Guide (APG) that is associated with the viewer channel selected by cursor 214. The APG typically includes information on the program or "show" that is currently being presented by the viewer channel shown in video cell 202A-F, as well as the time that show is being aired and the next show to be aired on that viewer channel. Other information, either in the APG or external to the APG, can also be displayed in the text box 204 when the cursor is moved to a given video cell 202A-F.

As such, the viewer can "interact" with the interactive mosaic channel 200 and decide which audio track to listen to, find out a plot line of each of the shows being presented in the various video cells 202, find out what is going to be aired next in the various viewer channels being presented in video cells 202, or listen to generic audio from the barker cell 206 or associated with the interactive mosaic channel 200 itself while variously viewing the video presentations in the video cells 202. If a specific video cell 202 presents video information that is of interest to a viewer, then the viewer can move cursor 214, via a remote control command, to a given video cell 202, and listen to the audio associated with that video cell 202 and find out more about that viewer channel in text box 204.

If the viewer decides that the selected video cell 202 is of enough interest, the viewer can then directly tune to the selected video cell 202, i.e., tune directly to that viewer channel that is providing the video and audio used to create video cell 202, by pressing a single button on the remote control 224 (typically the "select" button on a DIRECTV remote control). This will tune the IRD 112 or monitor 114 to that viewer channel, which will then be presented full-screen to the viewer as in a normal television monitor 114 viewing format.

The barker cell 206, since it typically contains audio and video information that is not located on any viewer channel other than the interactive mosaic channel 200, cannot typically be selected for full screen viewing by the viewer on monitor 114. However, the barker cell 206 can be selected for full monitor 114 viewing, or at least enough of the monitor 114 to allow for changes in the video cells 202 as described below, to allow for changes in the interactive mosaic channel 200 and in the control bar 210 in near-real-time.

Control Bar

The Control Bar 210 (also called the Attract Icon or the Attract Icon Bar) The control bar 210 allows for instant, on-screen access to several data sources that allow the viewer to access data related to that being shown in the video cells 202A-F as well as other viewer channels available within system 100. Those IRDs 112 that have interactive capabilities have special buttons that correspond to the icons that appear on the control bar 210. Each icon/button directs the viewer to a different screen, such as special events, or, in the case of the present invention, data related to real-time or near-real-time viewership of channels within system 100. Each screen can have sub-screens that further allow related data to be viewed or otherwise analyzed by the viewer. Further, control bar 210 can comprise statistics, data, or other information related to the video cells 202A-F being shown in monitor 114.

For example, and not by way of limitation, one of the remote control 224 buttons, e.g., the "red" button 234, indicated by text and/or graphics on control bar 210, may take a viewer to the "What's Hot" page, where viewers can review data related to viewership of shows currently being aired within system 100.

Similarly, a "special" page can be accessed by pressing a different button on the remote control 224, e.g., the "green" button 236, or the blue button 238 or yellow button 240, where viewers can view a channel or other data page. The special page can be reprogrammed by the system provider or the viewer based on time, or, in the case of interactive mosaic channel 200, can be done by genre. For example, and not by way of limitation, the special page can be assigned to the NCAA bracket for a "Sports" mosaic channel 200, and, if the viewer changes to a "News" mosaic channel 200, the special page can be a breaking news channel or news recap video loop that is provided by the system provider. There can be more than one special "page" that is accessible from the buttons 234-240, or other buttons on the remote control 224, if desired.

Video Control System

FIG. 3 illustrates an embodiment of a video control system in accordance with the present invention.

System 300 comprises a video router 302 and a controller 304. Controller 304 communicates with video router 302 via cable 306. Typically, controller 304 is a personal computer or other microprocessor controlled device, and can be coupled to video router 302 via cable, fiber optic connection, or via radio frequency or internet access as desired.

Video router 302 accepts as inputs various video inputs 308-320. A larger or smaller number of video inputs 308-320 can be used by video router 304 without departing from the scope of the present invention. Through control commands sent to video router 302 from controller 304, various composite video outputs 322-326, i.e., mosaic channel outputs 322-326, are generated by video router 304. Typically, system 300 is contained in a trailer or other room located near where the video inputs 308-320 are being used; however, such geographical proximity is not required.

Video router 302 is used to transport video inputs 308-320, either alone or in combination, to the video outputs 322-326. Typically, routers are described by the number of inputs by the number of outputs, e.g., a four input, ten output router 302 would be called a 4×10 router. The type of video signals transported by router 302 can be anything from analog composite signals, e.g., Phase Alternating Line (PAL) signals, National Television Systems Committee (NTSC) signals, to analog components such as Serial Digital Interface (SDI) signals, High-Definition SDI (HD-SDI) signals, etc. Broadband types of video routers 302 can route more than one signal type, e.g., SDI and HD-SDI signals, simultaneously.

Any of the inputs 308-320 of video router 302 can be transported to any of the video outputs 322-326. The internal arrangement of the video router 302 is typically arranged as a series of crossover points that are selectively activated or deactivated to block or pass a given input 308-320 to a given output 322-326. These crossover points are typically controlled by external switches and/or software to activate/deactivate a given crossover point, which control is typically provided by controller 304.

The video router 302 in combination with controller 304, allows a producer or director of a given viewer channel to control what is being seen on that channel by controlling which video inputs 308-320, alone or in combination, that are being broadcast on one of the outputs 322-326, and thus, the content of a given viewer channel. Controller 304 further controls the appearance, layout, and additional items that appear on a given video channel, such as control bar 210, the placement of video cells 202A-F, and the video input or inputs 322-326 that appear in a given video cell 202A-F.

The various composite video outputs 322-326 can all be directed to different viewer channels if desired; however, it is within the scope of the present invention to send the various composite video components 322-326 to the same viewer channel in sequential order based on commands received from the controller 304. This control of a single video channel allows for automated control of video input to a given viewer channel, and, as such, allows for rapid change in viewer channel display of information through computer control (i.e., controller 304) of the viewer channel presentation.

Figure 4A:
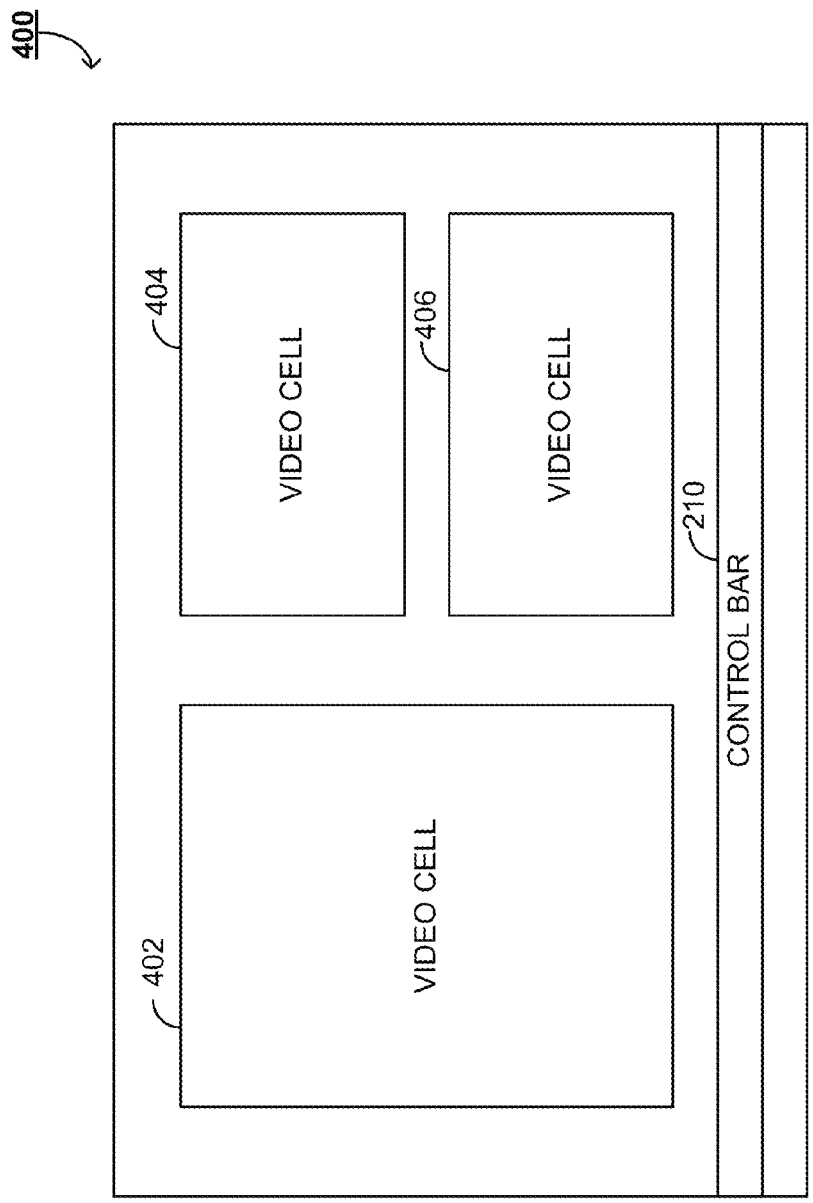
FIGS. 4A-4C illustrate an example of the usage of the video control system in accordance with the present invention.

So, for example, and not by way of limitation, controller 304 sends commands to video router 302 to select video inputs 308, 312, and 316 for display on a single viewer channel, and provides the locations for each of the video inputs 308, 312, and 316 to be displayed on a single viewer channel, along with a control bar 210. Such a typical monitor 114 display is shown in FIG. 4A, which is herein described in further detail below.

For example, and not by way of limitation, an operator, producer, or director can use an input device, such as a mouse, touch screen, or other control device, to provide inputs to controller 304 which, in turn, controls video router 302. When a decision is made to provide a viewer screen, with one or more video inputs 308-320 being used to create one or more video outputs 322-326, the controller 304 is sent input data to select, for example, video inputs 308, 312, and 316. Such inputs can be made via mouse click, touchpad, touch screen, or other input device, as desired. Once the viewer screen with video inputs 308, 312, and 316 is arranged to the liking of the director and/or producer, the inputs can be forwarded to the desired video output 322-326. The producer, director, and operator thus have a preview of the viewer channel as it would be viewed by viewers prior to a viewer ever seeing the composite video on monitor 114. Once forwarded to the desired video output 322-326, the signal is sent via system 100 to IRD 112 and available on monitor 114 for viewers to watch in their homes.

Standardized arrangements of video cells 202A-F, or video inputs 308-320 as composite inputs to one or more of the video outputs 320-326, can be set up in advance or in real-time to allow the producer and director to switch to "standardized" viewer screens, which can expedite changes between one viewer screen and another. Further, one or more of the video inputs 308-320 can be locked or forced into a specific video cell 202A-F, and other video inputs 308-320 required to be moved around the locked inputs. For example, and not by way of limitation, a network feed coming in on, for example, video input 308, can be locked into video cell 202C, such that the network feed always appears in the upper right hand of the viewer screen 200.

Other inputs, such as animations, logos, advertisements, condition changes such as caution flags in auto racing, red zone possessions in football, base runners in baseball, and other contest or condition occurrences, can also be displayed and controlled by controller 304. Such condition changes can be shown by visual, audio, or other clues that are displayed on controller 304, and can be selectively forwarded to video outputs 322-326 as desired.

Monitor Displays

Figure 4B:
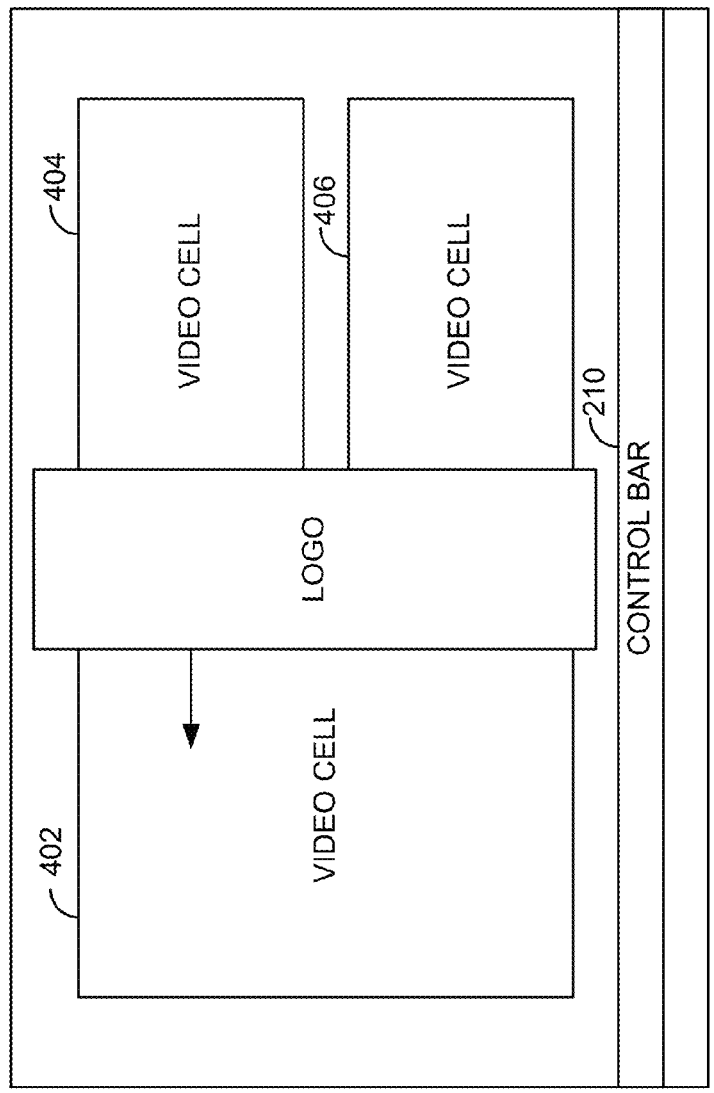
Figure 4C:
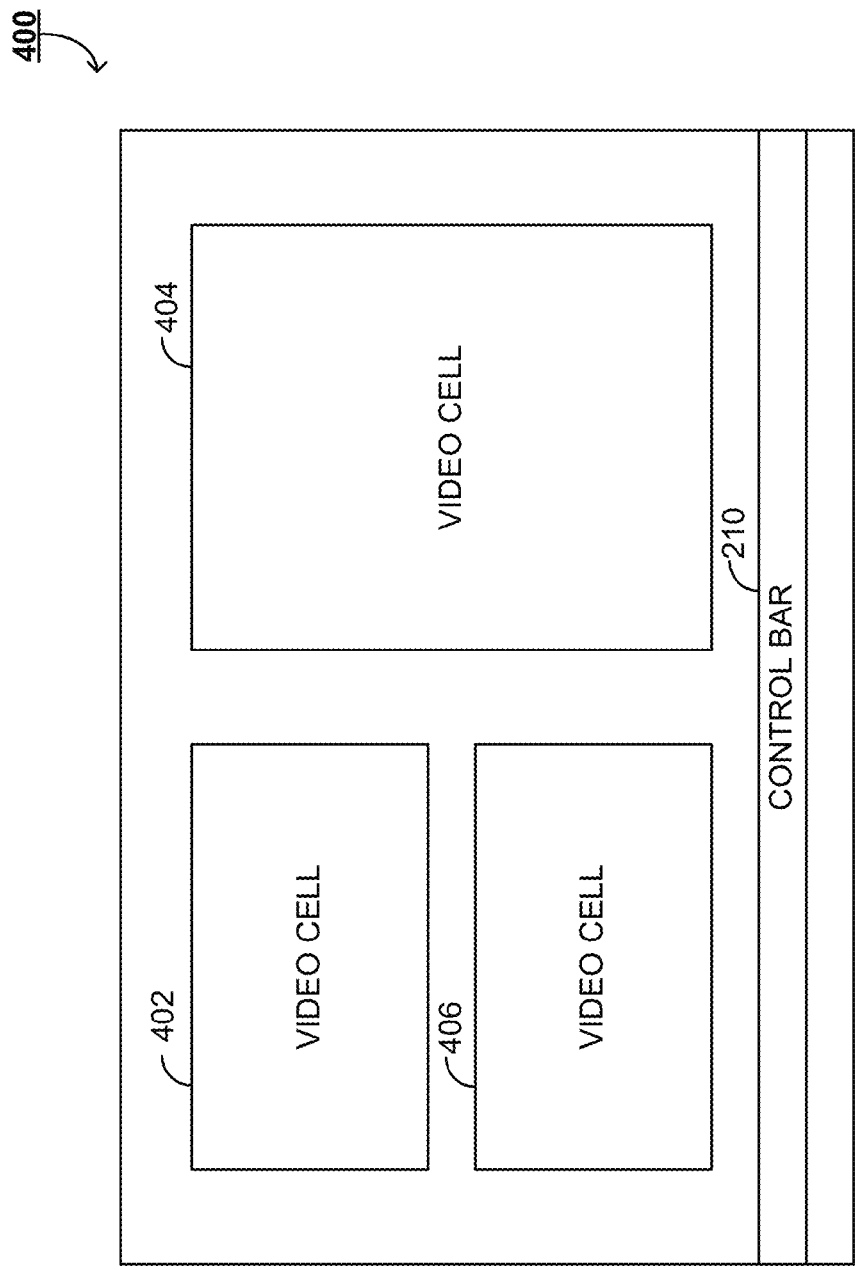

FIGS. 4A-4C illustrate an example of the usage of system 300 in accordance with the present invention.

Screen 400 illustrates a specific embodiment of screen 200 shown on monitor 114, with a first video cell 402, second video cell 404, third video cell 406, and control bar 210 displayed on monitor 114. For illustrative purposes, first video cell 402 displays the video information of video input 308, second video cell displays the video information of video input 312, and third video cell displays the video information of video input 316. The location, size, and other display features of each of the video cells 402-406 are determined by controller 304. The screen 400 is thus a composite video display of one of the video outputs 322-326, and, for exemplary purposes herein, will be known as video output 322.

Video cells 402-406 can be video presentations that are unique to a given viewer channel, or can be network feeds or other video information that is available on other viewer channels or on network channels. Control bar 210 can provide text, statistics, or other information that is related to one or more of the video cells 402-406, or to other video information that is not being shown in screen 400.

For example, and not by way of limitation, screen 400 can be a driver channel that is associated with a specific driver in a NASCAR race. Video cell 402 can be the "in car" camera for that driver, video cell 404 can be the network feed of the race leaders, and video 406 can be a crew chief video or pit crew video associated with the driver. Control bar 210 can show statistics related to the overall leader, as well as statistics that relate this driver to the leader in terms of seconds behind, race standing for this driver, number of laps completed, engine temperature for this driver's car, tachometer/speedometer reading for this driver's car, etc.

During certain times in the race, the video information from one or more of the video inputs 308-320 becomes more important than the video information being shown in screen 400. For example, one of the video cells 402-406 is the "driver cam" perspective, e.g., the driver's view of the race. During race conditions, this is an important shot; it is of interest to viewers to watch the driver's perspective as s/he passes other cars, is passed by other cars, etc. However, when that driver enters the pit area, the driver perspective is not quite so important; the perspective of the pit crew, the crew chief, and the audio of the crew chief/pit crew become more important to viewers. Controller 304 and video router 302 are used to change the viewer's experience in real time to capture these changing perspectives, as shown in FIGS. 4B-4C.

FIG. 4B illustrates a logo wipe in accordance with the present invention.

As shown in FIG. 4B, when a change in the screen 400 is desired, e.g., because a change in perspective is needed for one of the video feeds 402-406, because a new video feed is to be added to the screen 400, etc., a logo 408 can be "wiped" across screen 400 via controller 304 and video router 302. Logo 408 can be a simple box, or can be a logo associated with the screen 400. For example, and not by way of limitation, if screen 400 is focusing on a specific driver in the race, the logo 408 can be the number of that driver's car, the driver's car, or another indicator that is associated with the video/audio portion of the screen 400. The logo 408 can also be a sponsor or other commercial advertisement. Further, logo 408 can be accompanied with an audio track, and can be different logo or video/audio combinations. So, for example, and not by way of limitation, the first time the logo 408 is wiped across the screen, the logo 408 can be wiped from left to right, and logo 408 is the number of the driver's car. The second time the logo 408 is wiped across the screen, the logo 408 can be wiped from right to left, and can be the driver's car. In this way, the logo 408 is indicating to the viewer some action on the screen.

The logo 408 can thus be an indicator to the viewer what event is occurring on the screen 400. For example, and not by way of limitation, when the logo 408 is a green flag, this indicates a start or a restart of the race; when the logo 408 is a yellow flag, the wipe indicates a caution; when the logo 408 is the car's number, it indicates that the car is going into the pit area; when the logo 408 is the car itself, it indicates that the car is coming out of the pit area. Other logos 408 can be used as desired without departing from the scope of the present invention.

FIG. 4C illustrates a viewer channel monitor display after the logo wipe in accordance with the present invention.

After the logo 408 wipe, the video feeds 402-406 have been re-sized and moved on screen 400. The video feeds 402-406 now show a different feed, possibly a different camera input to controller 304, or may indicate that a different video input, namely, video feed 404, is likely to be of greater interest to the viewer than video feeds 402 and 406. This re-sizing and placement of the video feeds 402-406 allows the viewer a customized viewing perspective which dynamically changes as the viewed event unfolds.

For example, and not by way of limitation, the viewer will typically want to see his favorite driver's car in a larger format than other cars in a given race, but will want to see the race leader or larger perspective on the race itself. The viewer will also want to see what is going on with the crew chief of his favorite driver's car. So, as shown in FIG. 4A, the standard format for screen 400 can be the driver's car close-up in video feed 402, the race perspective (typically a network feed) in video feed 404, and the crew chief shown in video feed 406.

However, when the driver enters the pit area, the viewer will likely want to see what is going on in the pit area rather than the race itself, as illustrated in FIG. 4C. The driver perspective will likely not have as much importance, but the pit crew's performance now becomes vital. So, a logo 408 wipe occurs when the driver crosses into the pit area, and video feed 402 changes size, indicating that the driver perspective is less important. Further, video feed 402 may change camera inputs to now show a rival's pit stop rather than the driver's perspective. Video feed 404, which has changed sizes to indicate that this video may be of primary importance, now can show the race progress, or can show a close-up of the pit crew working on the driver's car, either from an overhead perspective or from a different camera perspective. Video 406 can show the crew chief and his reaction to the pit stop as well. As the driver exits the pits, a logo 408 wipe occurs (as shown in FIG. 4B) and the video feeds 402-406 return to the screen 400 layout shown in FIG. 4A.

Pit crew statistical information is additional information that is provided to the viewer, either via one or more video inputs 308-320 or via control bar 210. It is also possible to use such information to allow viewers to predictively game based on pit crew performance, race driver lap times, etc. So, for example, and not by way of limitation, viewers can use system 100 and IRD 112, typically via remote control 224, to place a predetermined time of pit crew performance for a specific driver into system 100. The time that actually occurs for that driver is then compared to the predicted time, and prizes can be awarded based on the accuracy of the prediction. System 100 users can use such statistics to compete against each other, or against other system 100 users, for prizes, additional system 100 features, or other remuneration as desired by system 100 operators. Further, this can also be used for predictive gaming on other sporting events that are based upon contestant performance in real time.

Control bar 210 also may undergo changes based on the logo 408 wipe. For example, the engine RPM when a driver is in the pit area is somewhat irrelevant, as is the driver's speed. So, the statistics shown on control bar 210 can change to, for example, pit stop elapsed time, amount of fuel being added to the driver's car, etc., because these statistics are more relevant to the video being shown on screen 400. Control bar 210 can also be changed based on time and/or other telemetry. So, for example, and not by way of limitation, the fastest lap and last lap information can be shown as a driver passes the start/finish line, or at some other periodic time frame, or can also be shown when the director and/or producer decide such information should be shown.

The present invention can be used at any filming location where multiple camera inputs are used, and where multiple camera viewing on screen 400 is desirable. For example, and not by way of limitation, a football game can have a camera angle on the line of scrimmage shown in video feed 402 of FIG. 4A, a second camera can be following a star player (who may be wired with a microphone) and shown in video feed 404, and the coach, either the head coach or the offensive coordinator, can be shown in video feed 406. The viewer can then listen to audio from the network feed (video feed 402), the audio from the receiver (video feed 404) or the coach (video feed 406). As timeouts are called, or field goals are attempted, or other events occur during the contest, a logo 408 can be wiped (as shown in FIG. 4B) across the screen (logo 408 could be the team logo, for example) to change the inputs such that the video feeds 402-406 receive different camera inputs, different audio inputs, etc. Such a change in the screen 400 allows the viewer to have a more in-depth experience with the program that the viewer is watching.

CONCLUSION

The present invention discloses a mosaic video channel and a system for generating the mosaic video channel. A mosaic video channel in accordance with the present invention is displayed on a monitor with a plurality of individual video feeds being presented at a given time, and comprises a plurality of video cells presenting at least video information, each video cell associated with one of the plurality of individual video feeds, a cursor, which can be moved between the plurality of video cells, for selecting at least one characteristic associated with a selected video cell, and a receiver, coupled to the monitor and receiving the mosaic video channel, wherein the mosaic channel is changed via a controller which initiates a logo wipe across the mosaic video channel.

Such a mosaic channel further optionally comprises changing the orientation of the video cells when the logo wipe occurs, the controller changes at least one video feed associated with one of the plurality of video cells, access to the video feeds associated with one of the plurality of video cells is accessible only when the mosaic channel is accessible by the receiver, and at least one orientation of video cells is a predetermined orientation of video cells.

A system in accordance with the present invention dynamically changes a mosaic video channel, and comprises a controller and a video router, coupled to the controller, the video router accepting video inputs from a plurality of sources and generating a plurality of mosaic channel configurations as outputs, wherein the controller commands the video router to use specific ones of the plurality of sources in a given mosaic channel configuration.

Such a system further optionally includes the controller further commanding the video router to selectively switch between a first mosaic channel configuration and a second mosaic channel configuration, the controller commands the video router to switch between the first mosaic channel configuration and the second mosaic channel configuration using a logo wipe, access to the video feeds associated with one of the plurality of video cells is accessible only when the mosaic channel is accessible by the receiver, and at least one of the plurality of mosaic channel configurations is a predetermined layout of video cells.

An apparatus in accordance with the present invention displays a mosaic video channel, the mosaic video channel having a plurality of video cells being presented at a given time, and comprises a broadcast delivery system, comprising a transmitter and a receiver, a monitor, coupled to the receiver, for selectively displaying the mosaic video channel, each video cell associated with one of a plurality of individual video feeds, and a cursor, displayed on the monitor, which is movable between the plurality of video cells, for selecting at least one characteristic associated with a selected video cell, such that when a video program associated with the selected video cell is selected, the characteristic of the selected video cell is presented; wherein the mosaic channel is changed via a controller which initiates a logo wipe across the mosaic video channel.

Such an apparatus further optionally comprises the broadcast delivery system being a satellite television delivery system, a plurality of mosaic video channels, access being granted only to a subset of the plurality of mosaic video channels at a given time, access being granted access to only one of the mosaic video channels at a time, access to the video feeds associated with one of the plurality of video cells being accessible only when the mosaic channel is accessible by the receiver, each of the plurality of mosaic video channels comprising a video cell common to all of the mosaic video channels, at least one configuration of the plurality of video cells is a predetermined layout of video cells, and predictive gaming information is compared to data transmitted with at least one of the individual video feeds.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims appended hereto and the full range of equivalents to the claims appended hereto.

What is claimed is:

1. A system for providing a mosaic video viewer channel, comprising:
    a receiver, that receives a signal having a mosaic video channel comprising a plurality of video feeds, and provides a plurality of video cells presenting at least video information within the mosaic video viewer channel, wherein:

each video cell is associated with one of the plurality of individual video feeds and the mosaic video viewer channel being a viewer channel distinct from a program guide;

the receiver provides a cursor, which can be moved between the plurality of video cells, for selecting a selected video cell;

wherein the mosaic video viewer channel is changed via a controller remote from the receiver which initiates a logo wipe across the mosaic video viewer channel; and wherein the logo wipe is initiated to be associated with a change in a configuration of the video cells in the mosaic video viewer channel or a change in the presentation of a live event, wherein at least one of the video cells depicts the live event.

2. The system of claim 1, wherein the change in the configuration comprises a changed orientation of the video cells.

3. The system of claim 2, wherein the change is a change of at least one video feed associated with one of the plurality of video cells.

4. The system of claim 2, wherein access to the video feeds associated with one of the plurality of video cells is accessible only when the mosaic video viewer channel is accessible by the receiver.

5. The system of claim 4, wherein at least one orientation of video cells is a predetermined orientation of video cells.

6. The system of claim 1, wherein the change is the change in the configuration of the video cells in the mosaic video viewer channel, and:

at least one of the video cells depicts a live event, and the change in the configuration of video cells is in response to a change in the presentation of the live event;

the logo wipe comprises an indicator describing a characteristic of the change in the presentation of the live event.

7. The system of claim 1, wherein the change is the change in the configuration of the video cells in the mosaic video viewer channel, and the change in the configuration comprises a change in a size of at least one of the video cells.

8. The system of claim 1, wherein the change is the change in the presentation of the live event wherein at least one of the video cells depicts the live event, and the logo wipe comprises an indicator describing a characteristic of the change in the presentation of the live event.

9. The system of claim 8, wherein the change in the presentation of the live event comprises a change of the live event, and the logo wipe comprises an indicator describing a characteristic of the change in the live event.

10. The system of claim 9, wherein the live event is a race and the change in the live event comprises a change in race leadership; a pit stop; or a change in race status indicated by a red flag, a yellow flag or a green flag.

11. The system of claim 9, wherein the change in the event is a score change of the event.

12. The system of claim 8, wherein:

the video cells each comprise one of a plurality of views of the same live event, each of the plurality of views from a different perspective;

the change in the presentation of the live event comprises a change in a perspective of the at least one of the video cells; and the logo wipe comprises an indicator of the changed perspective.

13. The system of claim 8, wherein:

the video cells each comprise one a plurality of views of a subject in the live event;

the change in the presentation of the live event comprises a change of the subject from a first participant to a second participant; and the logo wipe comprises an indicator identifying the second participant.

14. A system for dynamically changing a mosaic video viewer channel, comprising:

a controller; and a video router, coupled to the controller, the video router accepting video inputs from a plurality of sources and generating a plurality of mosaic channel configurations as outputs, the video inputs and mosaic video viewer channel being a viewer channel distinct from a program guide, wherein the controller commands the video router to use specific ones of the plurality of sources in a given mosaic video viewer channel configuration, wherein the controller selectively commands the video router to initiate a logo wipe;

wherein the logo wipe is initiated to be associated with a change in a configuration of the video cells in the mosaic video viewer channel or a change in the presentation of a live event, wherein at least one of the video cells depicts the live event.

15. The system of claim 14, wherein access to the video feeds associated with one of the plurality of video cells is accessible only when the mosaic video viewer channel is accessible by the receiver.

16. The system of claim 15, wherein at least one of the plurality of mosaic video viewer channel configurations is a predetermined layout of video cells.

17. An apparatus for displaying a mosaic video viewer channel, the mosaic video viewer channel having a plurality of video cells being presented at a given time, comprising:

a broadcast delivery system, comprising a transmitter and a receiver;

a monitor, coupled to the receiver, for selectively displaying the mosaic video viewer channel, each video cell associated with one of a plurality of individual video feeds, the mosaic video viewer channel being distinct from a program guide; and a cursor, displayed on the monitor, which is movable between the plurality of video cells, for selecting at least one characteristic associated with a selected video cell, wherein the mosaic video viewer channel includes a logo wipe;

wherein the logo wipe is initiated to be associated with a change in a configuration of the video cells in the mosaic video viewer channel or a change in the presentation of a live event, wherein at least one of the video cells depicts the live event.

18. The apparatus of claim 17, wherein the broadcast delivery system is a satellite television delivery system.

19. The apparatus of claim 18, wherein the monitor selectively displays a plurality of mosaic video viewer channels.

20. The apparatus of claim 19, wherein access is granted only to a subset of the plurality of mosaic video viewer channels at a given time.

21. The apparatus of claim 20, wherein access is granted access to only one of the mosaic video viewer channels at a time.

22. The apparatus of claim 21, wherein access to the video feeds associated with one of the plurality of video cells is accessible only when the mosaic video viewer channel is accessible by the receiver.

23. The apparatus of claim 22, wherein each of the plurality of mosaic video viewer channels comprises a video cell common to all of the mosaic video viewer channels.

24. The apparatus of claim 23, wherein at least one configuration of the plurality of video cells is a predetermined layout of video cells.

25. The apparatus of claim 17, wherein the mosaic video viewer channel comprises information transmitted with at least one of the individual video feeds about an event depicted in the respective at least one of the individual video feeds of the mosaic video viewer channel, the information for comparison to respective user-predicted information about the event and used to determine user remuneration.

* * * * *